(12) United States Patent
Ganapathy et al.

(10) Patent No.: US 8,943,551 B2
(45) Date of Patent: Jan. 27, 2015

(54) CLOUD-BASED DEVICE INFORMATION STORAGE

(75) Inventors: Narayanan Ganapathy, Redmond, WA (US); Esaias E. Greeff, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/113,384

(22) Filed: May 23, 2011

(65) Prior Publication Data

US 2011/0225640 A1 Sep. 15, 2011

Related U.S. Application Data

(63) Continuation-in-part of application No. 12/191,724, filed on Aug. 14, 2008, now Pat. No. 8,769,612.

(51) Int. Cl.
*H04L 29/00* (2006.01)
*H04W 12/06* (2009.01)
*H04W 12/08* (2009.01)
*H04W 12/04* (2009.01)

(52) U.S. Cl.
CPC .............. *H04W 12/06* (2013.01); *H04W 12/08* (2013.01); *H04W 12/04* (2013.01)
USPC ............... 726/3; 713/155; 713/156; 713/157; 713/158; 713/159

(58) Field of Classification Search
USPC .................................................. 713/155–159
See application file for complete search history.

(56) References Cited

U.S. PATENT DOCUMENTS

| 5,799,086 | A | 8/1998 | Sudia |
| 6,016,746 | A | 1/2000 | Lake et al. |
| 6,122,639 | A | 9/2000 | Babu et al. |
| 6,438,600 | B1 | 8/2002 | Greenfield et al. |
| 6,487,660 | B1 | 11/2002 | Vanstone et al. |
| 6,515,575 | B1 | 2/2003 | Kataoka |

(Continued)

FOREIGN PATENT DOCUMENTS

| CN | 102119391 | 7/2011 |
| EP | 1528751 | 5/2005 |

(Continued)

OTHER PUBLICATIONS

"Final Office Action", U.S. Appl. No. 12/191,724, (Mar. 20, 2012), 12 pages.

(Continued)

*Primary Examiner* — Ghazal Shehni
(74) *Attorney, Agent, or Firm* — Timothy Churna; Kate Drakos; Micky Minhas (57) ABSTRACT

Device information for each of multiple devices associated with a user account is maintained by a cloud service. The device information can include credential information allowing the device to be accessed by other ones of the multiple devices, remote access information indicating how the device can be accessed by other ones of the multiple devices on other networks, and property information including settings and/or device drivers for the device. The device information for each of the multiple devices is made available to other ones of the multiple devices, and can be used by the multiple devices to access one another and provide a consistent user experience across the multiple devices.

20 Claims, 6 Drawing Sheets

(56) References Cited

U.S. PATENT DOCUMENTS

| | | | |
|---|---|---|---|
| 6,941,148 | B2 | 9/2005 | Hansmann et al. |
| 6,976,253 | B1 | 12/2005 | Wierman et al. |
| 7,266,595 | B1 | 9/2007 | Black et al. |
| 7,620,667 | B2 | 11/2009 | Rollin et al. |
| 7,971,049 | B2 | 6/2011 | TeNgaio et al. |
| 8,099,761 | B2 | 1/2012 | Ganapathy |
| 8,285,674 | B2 | 10/2012 | Landry et al. |
| 8,341,249 | B2 | 12/2012 | Rakowski et al. |
| 8,769,612 | B2 | 7/2014 | Ganapathy |
| 2003/0100307 | A1 | 5/2003 | Wolochow et al. |
| 2003/0115256 | A1 | 6/2003 | Brockway et al. |
| 2004/0128345 | A1 | 7/2004 | Robinson et al. |
| 2005/0114711 | A1 | 5/2005 | Hesselink et al. |
| 2005/0208803 | A1* | 9/2005 | Rohatgi et al. ............. 439/159 |
| 2005/0257226 | A1 | 11/2005 | Belvin et al. |
| 2005/0289265 | A1 | 12/2005 | Illowsky et al. |
| 2006/0064493 | A1 | 3/2006 | Hammell et al. |
| 2006/0085639 | A1 | 4/2006 | Phillips et al. |
| 2006/0095954 | A1* | 5/2006 | Buckley et al. ............... 726/2 |
| 2006/0123147 | A1 | 6/2006 | Yasuhara |
| 2006/0200856 | A1 | 9/2006 | Salowey et al. |
| 2006/0218549 | A1 | 9/2006 | Hsu et al. |
| 2006/0223516 | A1 | 10/2006 | Fan et al. |
| 2006/0253894 | A1 | 11/2006 | Bookman et al. |
| 2007/0118891 | A1 | 5/2007 | Buer |
| 2007/0214272 | A1 | 9/2007 | Isaacson |
| 2007/0232272 | A1 | 10/2007 | Gonsalves et al. |
| 2007/0274422 | A1 | 11/2007 | Shivaji-Rao et al. |
| 2007/0283049 | A1 | 12/2007 | Rakowski et al. |
| 2008/0076389 | A1 | 3/2008 | Lee et al. |
| 2008/0229389 | A1* | 9/2008 | Singh et al. .................. 726/3 |
| 2009/0313363 | A1 | 12/2009 | Parsons et al. |
| 2010/0040233 | A1 | 2/2010 | Ganapathy |
| 2010/0043056 | A1 | 2/2010 | Ganapathy |
| 2010/0107225 | A1 | 4/2010 | Spencer et al. |
| 2012/0290694 | A9* | 11/2012 | Marl et al. ................ 709/223 |

FOREIGN PATENT DOCUMENTS

| | | | |
|---|---|---|---|
| EP | 1832998 | | 9/2007 |
| EP | 1862902 | | 12/2007 |
| EP | 1873668 | | 1/2008 |
| EP | 2158784 | * | 6/2008 |
| JP | 2000003336 | | 1/2000 |
| JP | 2006526208 | | 11/2006 |
| JP | 2009055259 | | 3/2009 |
| JP | 2011530960 | | 12/2011 |
| KR | 20110057149 | | 5/2011 |
| RU | 61491 | | 2/2007 |
| RU | 2011105187 | | 8/2012 |
| RU | 2512118 | | 4/2014 |
| WO | WO-02067483 | | 8/2002 |
| WO | WO-2004090781 | | 10/2004 |

OTHER PUBLICATIONS

"International Search Report & Written Opinion", PCT Application No. PCT/US2009/051154, (Feb. 11, 2010), 7 pages.

"International Search Report & Written Opinion", PCT Application No. PCT/US2009/051628, (Feb. 26, 2010), 8 pages.

Linsky, Joel et al., "Simple Pairing Whitepaper", http://www.bluetooth.com/NR/rdonlyres/0A0B3F36-D15F-4470-85A6-F2CCFA26F70F/0/SimplePairing_WP_V10r00.pdf, (Aug. 3, 2006), 23 pages.

Maniatis, Petros et al., "The Mobile People Architecture", http://hpl.hpl.hp.com/personal/Mary_Baker/publications/maniatis99mobile.pdf, (Jul. 1999), 7 pages.

Pals, Holger et al., "UML-Based Modeling of Roaming with Bluetooth Devices", *4 Roaming for Bluetooth*, http://www.swe.ingormatik.uni-goettingen.de/publications/HP_ZD_JG_HN/uml_based_bt_modeling.pdf, (2003), 7 pages.

Panayiotou, Christoforos et al., "mPERSONA: Personalized Portals for the Wireless User: An Agent", http://softsys.cs.uoi.gr/dbglobe/publications/Samara-Monet-F.pdf, (Dec. 2004), 28 pages.

"Non Final Office Action", U.S. Appl. No. 12/191,724, (Sep. 26, 2011), 9 pages.

Lin, Jyh-Shyan, "Cloud Data Storage for Group Collaborations", Retrieved at <<http://www.iaeng.org/publication/WCE2010/WCE2010__pp485-486.pdf>>, In the Proceedings of the World Congress on Engineering, vol. 1, Jun. 30-Jul. 2, 2010, pp. 2.

Malik, et al., "Accessing Remote Application without Installation at Host End Through Cloud Computing", Retrieved at <<http://www.ijcaonline.org/journal/number11/pxc387399.pdf>>, International Journal of Computer Applications, vol. 1, No. 11, 2010, pp. 44-46.

Chou, David, "Strong User Authentication on the Web", Retrieved at <<http://msdn.microsoft.com/en-us/library/cc838351.aspx>>, Aug. 2008, pp. 10.

"Microsoft Federation Gateway", Retrieved at <<http://msdn.microsoft.com/en-us/library/cc287610.aspx>>, Nov. 2009, pp. 36.

Bertocci, Vittorio, "Claims and Identity: On-Premise and Cloud Solutions", Retrieved at <<http://msdn.microsoft.com/en-us/library/cc836390.aspx>>, Jul. 2008, pp. 15.

"The Next Generation of Computing", Retrieved at <<http://download.microsoft.com/download/D/D/7/DD72762A-8C7A-43A2-8F25-52DF120D3D37/msft_cloud_computing_lowres_100809.pdf<<, Retrieved Date: Feb. 3, 2011, pp. 9.

"End User Configuration", *Cisco Unified Communications Manager Administration Guide*, Release 7.1(2), Available at <http://www.cisco.com/en/US/docs/voice_ip_comm/cucm/admin/7_1_2/ccmcfg/b08user.html>, (May 31, 2009), 18 pages.

"Non-Final Office Action", U.S. Appl. No. 12/191,724, (Apr. 18, 2013), 13 pages.

"Extended European Search Report", EP Application No. 09807046.9, (Jul. 9, 2012), 5 pages.

"Final Office Action", U.S. Appl. No. 12/191,752, (Jun. 29, 2011), 6 pages.

"Foreign Office Action", Chinese Application No. 200980131660.0, (Feb. 16, 2013), 9 pages.

"Foreign Office Action", EP Application No. 09807046.9, (Jul. 26, 2012), 1 pages.

"Non-Final Office Action", U.S. Appl. No. 12/191,752, (Jan. 24, 2011), 6 pages.

"Notice of Allowance", U.S. Appl. No. 12/191,752, (Sep. 19, 2011), 6 pages.

"Foreign Office Action", Chinese Application No. 200980131660.0, (Jul. 5, 2013), 8 pages.

"Foreign Office Action", Japanese Application No. 2011-523028, (Aug. 5, 2013), 4 Pages.

"Final Office Action", U.S. Appl. No. 12/191,724, Oct. 9, 2013, 13 pages.

"Foreign Office Action", JP Application No. 2011-523031, Jul. 30, 2013, 4 pages.

"Foreign Office Action", RU Application No. 2011105187, Jul. 17, 2013, 5 pages.

"Foreign Office Action", CN Application No. 200980131666.8, Oct. 22, 2013, 6 pages.

"Foreign Office Action", CN Application No. 200980131666.8, Apr. 3, 2013, 8 pages.

"Foreign Notice of Allowance", RU Application 2011105187, Oct. 23, 2013, 8 Pages.

"Foreign Office Action", CN Application No. 200980131660.0, Nov. 13, 2013, 8 Pages.

"International Search Report and Written Opinion", Application No. PCT/US2013/060489, Jan. 20, 2014, 11 pages.

"Notice of Allowance", U.S. Appl. No. 12/191,724, Feb. 21, 2014, 4 pages.

"Foreign Office Action", CN Application No. 200980131660.0, Mar. 25, 2014, 8 Pages.

"Non-Final Office Action", U.S. Appl. No. 13/931,690, Jul. 8, 2014, 10 pages.

"Foreign Notice to Grant", CN Application No. 200980131660.0, Sep. 30, 2014, 4 Pages.

\* cited by examiner

CLOUD-BASED DEVICE INFORMATION STORAGE

RELATED APPLICATIONS

This application is a continuation-in-part of U.S. patent application Ser. No. 12/191,724, filed Aug. 14, 2008, entitled "Portable Device Association" to Narayanan Ganapathy, which is hereby incorporated by reference herein.

BACKGROUND

As technology has advanced, the number of different devices that users have has increased. For example, users can have home and work computers, smartphones, printers, and so forth. Oftentimes, users desire to have these devices communicate with one another, such as to transfer data from a smartphone to a computer, print data, and so forth. Although allowing such communication can be beneficial, it is not without its problems. One such problem is that it can be burdensome for the user to configure these different devices to communicate with one another, reducing the user friendliness of the devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, device information for each of multiple devices associated with a user account is maintained by a cloud service. The device information includes, for one or more of the multiple devices, credential information allowing the device to be accessed by other ones of the multiple devices. The device information for each of the multiple devices is made available to other ones of the multiple devices.

In accordance with one or more aspects, at a first device, device information is obtained for a second device from a cloud service. The device information for the second device is associated with a user account of a user logged in to the cloud service. This device information for the second device is used, by the first device, to access the second device.

BRIEF DESCRIPTION OF THE DRAWINGS

The same numbers are used throughout the drawings to reference like features.

DETAILED DESCRIPTION

Cloud-based device information storage is discussed herein. A cloud service allows a user to associate various devices with his or her user account. These devices can include various different types of devices, such as home and work computers, smartphones, printers or printing services, and so forth. Device information for each of these various devices is maintained by the cloud service and can be obtained by other ones of the devices associated with his or her user account, allowing the devices to communicate with one another without the user having to individually configure each device to communicate with each other possible device. The device information can include credential information allowing a device to authenticate itself to another device to indicate it is permitted to access that other device. The device information can also include remote access information indicating how a device on one network can be accessed by a device on another network. The device information can also include various other attributes regarding the device, such as settings, drivers, and so forth.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and then can both generate and verify digital signatures for that particular entity (e.g., by encrypting or decrypting the data using the symmetric key).

Figure 1:
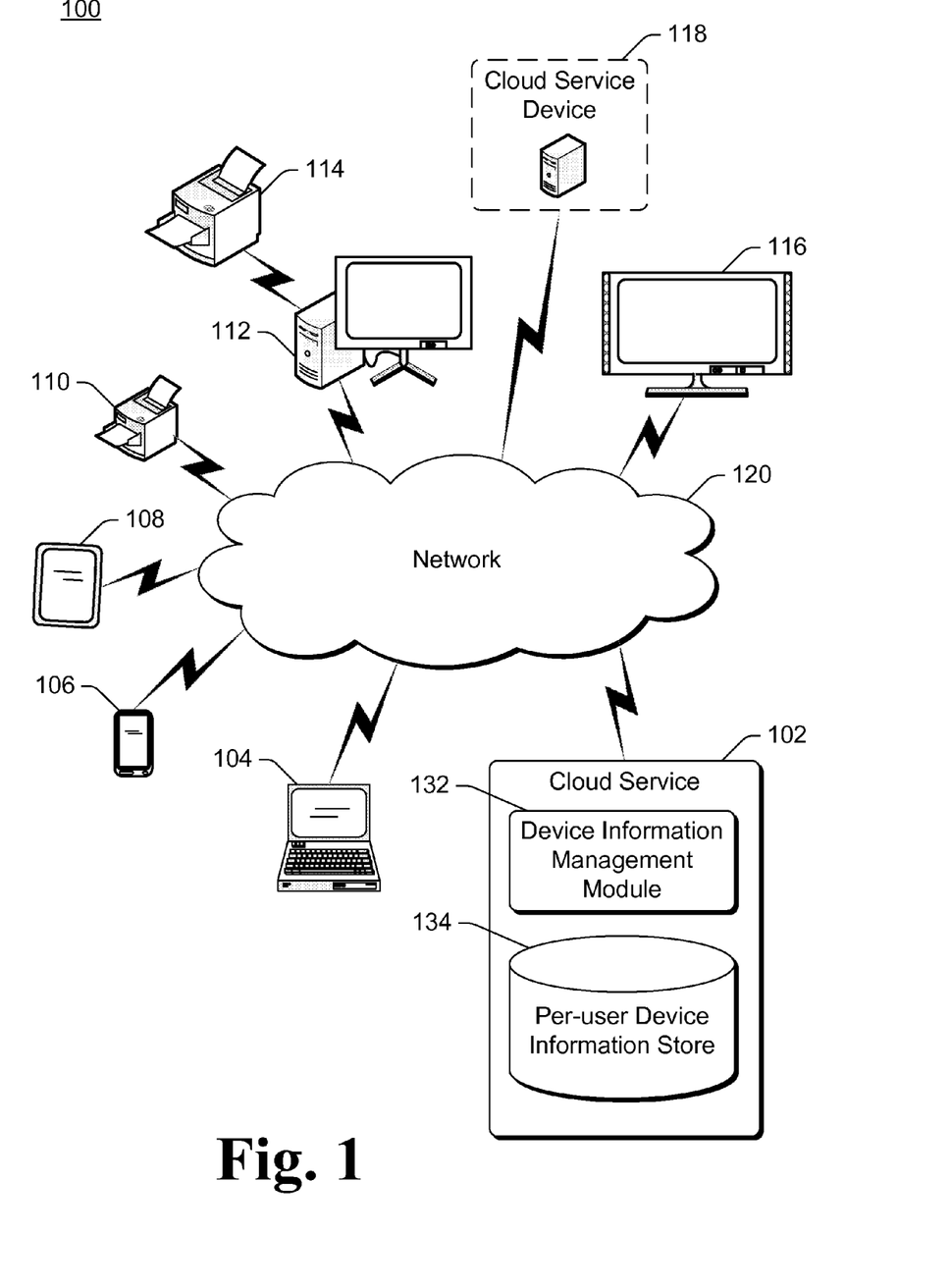
FIG. 1 illustrates an example system implementing the cloud-based device information storage in accordance with one or more embodiments.

FIG. 1 illustrates an example system 100 implementing the cloud-based device information storage in accordance with one or more embodiments. System 100 includes a cloud service 102 and various devices 104-118 that can communicate with one another, as well as with cloud service 102, via a network 120. Network 120 can be a variety of different networks, including the Internet, a local area network (LAN), a wide area network (WAN), a personal area network, a cellular or other phone network, an intranet, other public and/or proprietary networks, combinations thereof, and so forth. It should be noted that network 120 can be configured to include multiple networks.

Devices 104-118 can be a variety of different types of devices. For example, in system 100 device 104 is a laptop or netbook computer, device 106 is a cellular or other wireless phone (e.g., a smartphone), device 108 is a tablet or notepad computer, device 110 is a printer, device 112 is a desktop computer, device 114 is a printer (which communicates with other devices via device 112), device 116 is a television or other display device, and device 118 is a device represented by a cloud service (e.g., an online service storing audio/video content for playback, an online gaming service, and so forth). The devices illustrated in system 100 are examples of devices, and various other types of devices can also be included in system 100 such as a server computer, a mobile station, an entertainment appliance, a set-top box communicatively coupled to a display device, a game console, an automotive computer, a scanner, a facsimile machine, a wireless headset (e.g., a Bluetooth® headset), and so forth.

Cloud service 102 is a service that can be accessed by a user via a network (e.g., network 120 in the example of FIG. 1). Cloud service 102 is implemented using one or more of a variety of different types of devices, including one or more of the same types as devices 104-118 and/or other types of devices (e.g., server computers, mobile stations, and so forth). Cloud service 102 includes a device information management module 132 and a per-user device property store 134. Device information management module 132 manages storage and retrieval of device information for devices (e.g., one or more of devices 104-118) for each of multiple users of system 100. Per-user device information store 134 stores the device information for the devices for each of multiple users of system 100.

Device information for one or more devices 104-118 that are associated with a user can be saved to cloud service 102 as associated with a user account of that user. A device associated with a user is a device that the user is authorized to use, such as a device owned by the user, a device provided to the user (e.g., a work computer), a collection of devices that the user pays to use or has an account with (e.g., an online printing service), and so forth. Device information management module 132 receives the device information for a device 104-118 associated with a user account of cloud service 102, and stores the device information in per-user device information store 134 as associated with that user account. The user can subsequently log in to his or her user account using one of devices 104-118, and have that device access the device information associated with the user account in store 134. Thus, the user of a device can log in to his or her account, allowing that device to obtain the device information for the other devices associated with that user account. The device can use this device information to access or communicate with those other devices, as discussed in more detail below.

Figure 2:
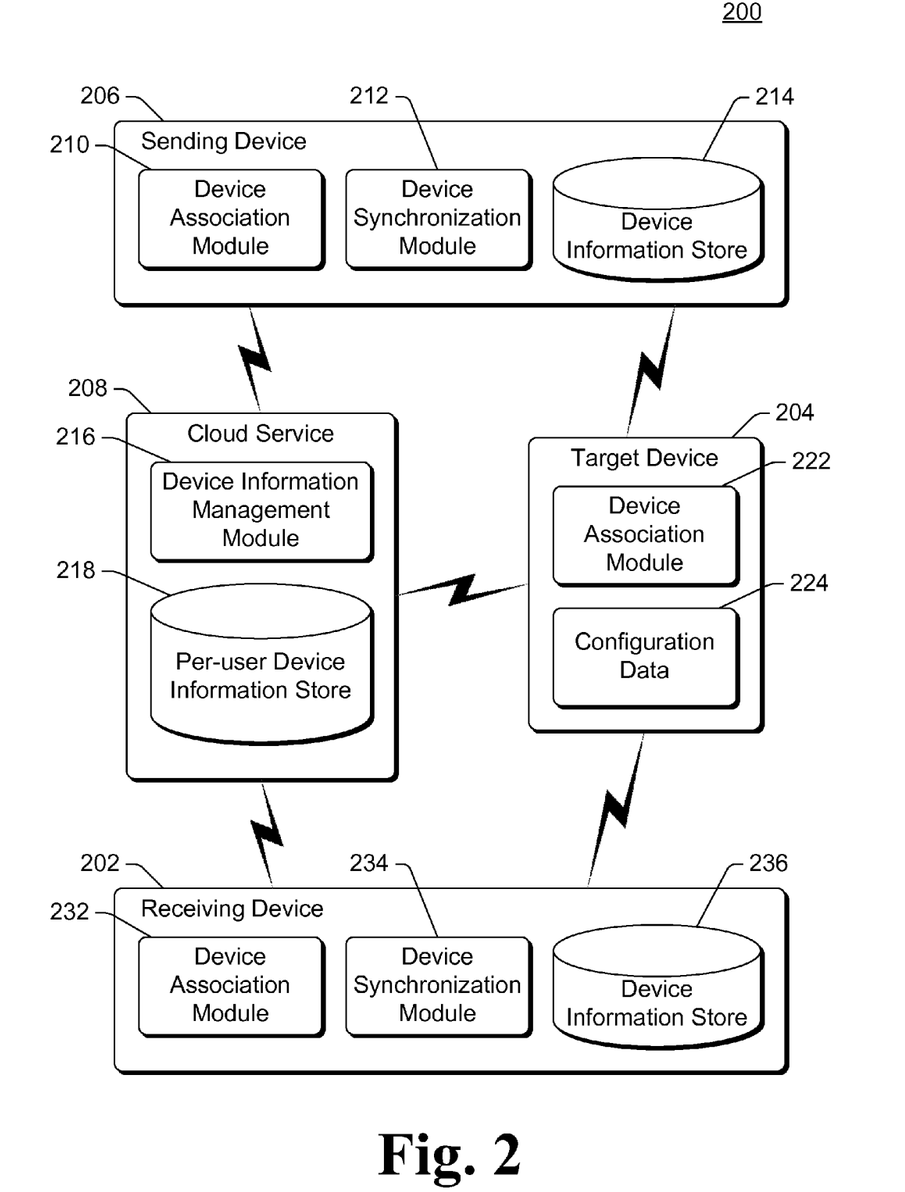
FIG. 2 illustrates an example system implementing the cloud-based device information storage in accordance with one or more embodiments.

FIG. 2 illustrates an example system 200 implementing the cloud-based device information storage in accordance with one or more embodiments. System 200 includes a receiving device 202, a target device 204, a sending device 206, and a cloud service 208. Cloud service 208 can be, for example, cloud service 102 of FIG. 1. Devices 202, 204, and 206 can each be a device 104-118 of FIG. 1.

Device 206 is referred to as being a sending device because device 206 sends or otherwise provides device information for target device 204 to cloud service 208. Device 202 is referred to as being a receiving device 202 because device 202 receives or otherwise obtains device information for target device 204 from cloud service 208.

System 200 is discussed with reference to receiving device 202 accessing target device 204. For example, receiving device 202 can be a laptop computer accessing target device 204 that is a remote printer, a desktop computer, a phone, and so forth. It should be noted that a particular device can be both a receiving device 202 and a target device 204 at different times and/or with respect to different devices. For example, at one point in time desktop computer device 112 of FIG. 1 can be a receiving device 202 accessing a printer device 110 of FIG. 1 that is a target device 204, and at the same point in time (and/or at another point in time) desktop computer device 112 of FIG. 1 can be a target device 204 being accessed by a laptop computer device 104 of FIG. 1 that is a receiving device 202. It should also be noted that sending device 206 can be a receiving device 202 and/or target device 204.

In system 200, sending device 206 obtains the device information for target device 204 and provides that device information to cloud service 208 as associated with a particular user account. Cloud service 208 maintains the device information for target device 204 as associated with that particular user account. Cloud service 208 makes the device information available to receiving device 202, which is also associated with that particular user account in the example of FIG. 2. Receiving device 202 can then use this device information obtained from cloud service 208 to access target device 204, as discussed in more detail below.

Cloud service 208 includes a device information management module 216 (which can be a device information management module 132 of FIG. 1) and a per-user device information store 218 (which can be a per-user device information store 134 of FIG. 1). Device information management module 216 receives the device information for target device 204 from sending device 206, and stores the device information in per-user device information store 218 as associated with the appropriate user account. Cloud service 208 can also implement user authentication functionality, or alternatively can communicate with a user authentication service that implements the user authentication functionality. The user authentication functionality authenticates a particular user as being authorized or permitted to use a particular user account, and can be performed in a variety of different manners. For example, the user can provide a user identifier and password that are verified by the authentication functionality, the user can provide a smartcard storing a digital certificate that is verified by the authentication functionality, and so forth.

Which user account the device information is to be associated with can be determined in different manners. In one or more embodiments, a user of sending device 206 logs in to his or her user account of cloud service 208, and device information provided to cloud service 208 by sending device 206 is automatically associated with that user account by cloud service 208. An indication of the user account can be provided to device information management module 216 in a variety of different manners. For example, a user can log in to his or her user account via sending device 206 and cloud service 208, in which case the user account is known to cloud service 208. By way of another example, the user can log in to his or her user account via sending device 206 and an authentication service (not shown), and the authentication service can provide the indication of the user account associated with sending device 206 to device information management module 216. By way of yet another example, the user can log in to his or her user account via sending device 206 and an authentication service (not shown), the authentication service can provide the indication of the user account (e.g., a token) to sending device 206, and sending 206 can in turn provide the indication of the user account to device information management module 216.

Alternatively, which user account the device information is to be associated with can be determined in different manners, such as being provided to sending device 206 by the user (optionally without logging in to his or her user account). For example, sending device 206 can be associated with a seller (e.g., online retailer, brick and mortar retailer, etc.) of devices, and can receive a user account identifier from a user that is purchasing a device. The user can provide his or her user account identifier to sending device 206 (optionally logging in to his or her account to make the purchase), and sending device 206 can provide that user account identifier to cloud service 208.

Figure 3:
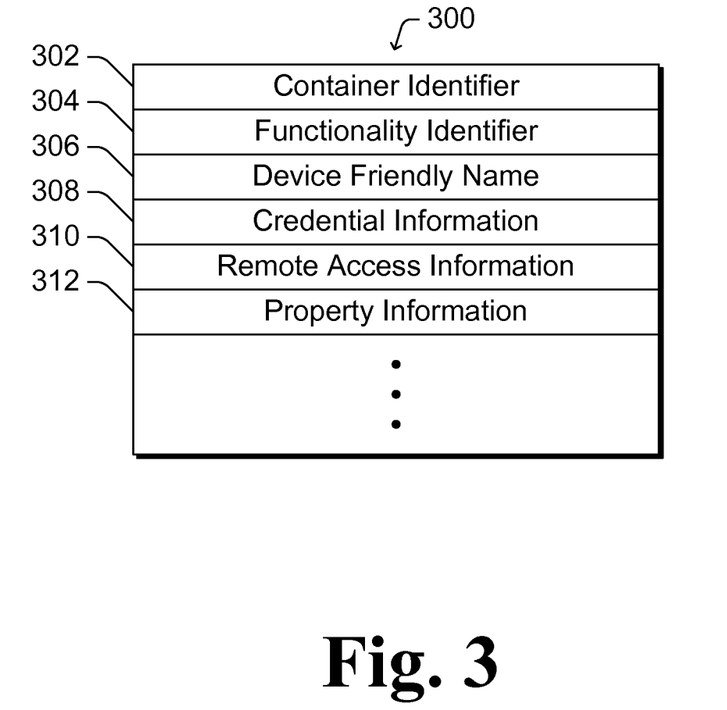
FIG. 3 illustrates example device information that is maintained by a cloud service for a device in accordance with one or more embodiments.

FIG. 3 illustrates example device information 300 that is maintained by a cloud service for a device in accordance with one or more embodiments. Device information 300 can be, for example, the device information for target device 204 of FIG. 2. Device information 300 includes a container identifier 302, which is an identifier of the device to which device information 300 applies (also referred to as the device with which device information is associated). Container identifier 302 allows the different devices associated with a user account to be distinguished from one another.

Functionality identifier 304 is an identifier of the functionality supported by the device to which device information 300 applies. The device can support single functionality (e.g., printing), or alternatively multiple functionality (e.g., printing, scanning, faxing, etc.). Functionality identifier 304 can take a variety of different forms, such as hardware identifiers corresponding to particular functions (e.g., a particular hardware identifier for printing functionality, another hardware identifier for scanning functionality, and so forth), a descriptive text of functionality, and so forth.

Device friendly name 306 is an identifier of the device to which device information 300 applies that is typically considered more readily understandable by users than container identifier 302. For example, the container identifier may be an integer or other alphanumeric string, while the device friendly name may be a name such as "Internet print service" or "home office printer".

Device information 300 also optionally includes credential information 308. Credential information 308 includes information allowing other devices to authenticate themselves to the device to which device information 300 applies in order for the other devices to indicate they are permitted to access the device to which device information 300 applies. This credential information can take a variety of different forms, such as a personal identification number (PIN), a symmetric key, a private key, a name and/or password, and so forth. In some situations the device to which device information 300 applies does not support or use authentication in order to be accessed by another device, in which case credential information 308 need not be included in device information 300.

Device information 300 also optionally includes remote access information 310. Remote access information 310 includes information indicating how the device to which device information 300 applies can be accessed by a device on another network. A device being on a particular network refers to the initial network (at any given time) that the device communicates with (e.g., the network for which a network address (e.g., Internet Protocol (IP) address) is assigned to the device). It should be noted that a device can communicate with multiple networks and thus can be viewed as being coupled to multiple networks at the same time, but the initial network that the device communicates with is the network that the device is on. It should also be noted that the initial network that the device communicates with can change over time (e.g., as the device moves). For example, the initial network that the device communicates with can be a home network (and the device can be assigned an IP address from a router of the home network), and through that home network the device can access the Internet and a corporate LAN. Even though the device is coupled to and can communicate with the Internet and corporate LAN, the device is viewed as being on the home network.

Remote access information 310 can take a variety of different forms, such as an identifier of a gateway (e.g., an IP address) of a network that the device to which device information 300 applies is on, an identifier of the device to which device information 300 applies on that network (e.g., an IP address of the device on the network), an identifier of credential information (analogous to credential information 308) used in order to be permitted by the gateway to access devices on that network, and so forth. In some situations the device to which device information 300 applies (or the network that the device to which device information applies is on) does not support or use such remote access, in which case remote access information 310 need not be included in device information 300.

Device information 300 also optionally includes property information 312. Property information 312 includes information identifying various attributes or properties of the device to which device information 300 applies, such as device settings, device drivers, applications, and so forth. For example, property information 312 can include manufacturer-supplied configuration settings indicating how the device to which device information 300 applies (or another device accessing the device to which device information 300 applies) is to be configured when accessed, such as language settings, region settings, security settings, and so forth. By way of another example, property information 312 can include user-specified settings indicating how the device to which device information 300 applies (or another device accessing the device to which device information 300 applies) is to be configured when accessed, such as any changes made by the user to the manufacturer-supplied configuration settings, settings desired by the user (e.g., screen resolution settings, print resolution settings, print location for an online service, etc.), and so forth. By way of yet another example, property information 312 can include device drivers and/or configuration files indicating how a device driver for the device to which device information 300 applies is to be installed on a particular device in order to allow that particular device to communicate with the device to which device information 300 applies (e.g., property information 312 can include the device drivers and/or configuration files, and/or can include identifiers of locations where the device drivers and/or configuration files can be obtained (such as other services, devices, and so forth)). By way of still another example, similar to the device drivers, property information 312 can include applications to be installed on a particular device in order to allow that particular device to communicate with (or otherwise facilitate communication with) the device to which device information 300 applies (e.g., property information 312 can include the applications and/or identifiers of locations where the applications can be obtained).

Device information 300 can also optionally include various additional information regarding the device in addition to the information illustrated in FIG. 3.

Table I is an example of information that can be included as device information 300. It should be noted that the information in Table I is an example of information that can be included as device information 300, and that all the information listed in Table I need not be included as device information 300 and/or that additional information can be included as device information 300. The information in Table I can include information illustrated in FIG. 3, and/or additional information not illustrated in FIG. 3.

TABLE I

| Information | Description |
| --- | --- |
| Container ID | An identifier of the device. |
| Hardware IDs | Identifiers of the functionality supported by the device. |
| Network Information | A pointer to an identifier of the particular network that the device is on (e.g., an identifier of where information describing how to communicate with devices on that particular network is stored). |
| Device Category | An indication of a type or classification of the device (e.g., allowing an appropriate icon to be displayed in a user interface identifying the device). |
| Timestamp of last use | A date and/or time of when the device was last used (e.g., as provided by the device). |
| Presence | An indication of whether the device is currently powered on and available for use (e.g., available to be accessed by other devices). |
| Network Address | A network address (e.g., an IPv6 address and/or IPv4 address) of the device. |
| MAC Address | A MAC (Media Access Control) address of the device. |
| State | An indication of the state of the device (e.g., offline, sleeping, accessible via the network, on battery power, on AC power, etc.). |
| Wake pattern | An indication of a particular byte sequence that, arriving at the device, wakes the device from sleeping. |
| Current network | An identifier of the network that the device is currently on. |
| Network list | Identifiers of networks that the device has been on in the past. |
| User locale | A locale that the user account is associated with (e.g., a particular geographic region, language, domain, etc.). |
| Group name | An identifier of a group that the device is part of. |
| Task list | A list of tasks that can be accomplished with the device (e.g., which can be displayed in a user interface identifying the device). |
| Deletion indication | An indication whether the device information for the device should be deleted from the devices associated with the user account (e.g., due to its having been deleted from one of the devices associated with the user account). |
| First install | A time and/or date of when the device was first paired to another device by the user. |
| Deletion time | An indication of when the device information for the device was first deleted from one of the devices associated with the user account. |
| Discovery provider | An indication of the transport used to discover the device when first paired with a device associated with the user account (e.g., Bluetooth ®, Universal Plug and Play, Web Services on Devices, WiFi Direct, etc.). |
| Device identity | An identity of the device within the discovery provider namespace (e.g., a Bluetooth ® identifier of the device). |
| Association Information | An indication of credential information used to access the device. |

It should also be noted that some devices can themselves be directly coupled to a network, such as a device 110 or device 106 of FIG. 1 being directly coupled to network 120 of FIG. 1. Other devices, however, can be coupled to a network through another device (also referred to as a proxy), such as a printer 114 of FIG. 1 being coupled to network 120 through device 112 of FIG. 1. For a particular device that is coupled to a network through a proxy, the device information for that particular device includes the information allowing that particular device to be accessed through the proxy. For example, the device information for device 114 of FIG. 1 includes information allowing device 114 and device 112 to be accessed. Thus, a device coupled to a network through another device is still identified as a device in per-user device information store, and can be accessed by others of the user's devices as if the device were actually coupled directly to the network.

Such a device that is coupled to a network through a proxy can be treated as a separate device and have its own device information 300 in the per-user device information store, or alternatively can be treated as functionality of the proxy. For example, device 114 and device 112 can each have separate device information 300 with different container identifiers 302 in the per-user device information store. Alternatively, device 112 can have device information 300 in the per-user device information store with the print functionality of device 114 being identified in the functionality identifier of device information 300 of device 112 (in which case device 114 would not have separate device information 300 in the per-user device information store).

In one or more embodiments, if one device (a device A) is built into another device (a device B) such as a computer, then device B has device information 300 in the per-user device information store with the functionality of device A being identified in the functionality identifier of device information 300 of device B. However, if one device (a device C) is external to and coupled to another device (device B) such as a computer, then device C and device B both have their own device information 300 in the per-user device information store.

Returning to FIG. 2, sending device 206 can obtain the device information for target device 204 in a variety of different manners. The device information for target device 204 can be obtained from target device 204, can be generated by sending device 206, and/or can be obtained by sending device 206 from another device or user. In one or more embodiments, sending device 206 obtains the device information for target device 204 when target device 204 and sending device 206 are paired to one another. Pairing target device 204 and sending device 206 refers to devices 204 and 206 being configured to allow the devices 204 and 206 to access each other (or allow one to access the other) at the user's consent. The pairing of two devices includes device information (e.g., credential information, remote access information, and/or property information, as discussed above) for at least one of the devices being obtained by the other of the devices. The device information can be provided by the other of the devices being paired, or alternatively by another device. For example, target device 204 can provide to sending device 206 a name and password to be used by sending device 206 to access target device 204 as part of pairing devices 204 and 206. By way of another example, as part of pairing devices 204 and 206, a user of target device 204 and sending device 206 can provide a PIN to both target device 204 and sending device 206 to be used by sending device 206 and target device 204 to access one another. By way of yet another example, sending device 206 can obtain a device driver and/or configuration file from a disc or other device as part of pairing devices 204 and 206.

Sending device 206 includes a device association module 210, a device synchronization module 212, and a device information store 214. Device association module 210 manages pairing sending device 206 with another device, such as target device 204. Sending device 206 can also be paired with various other devices. Device information store 214 maintains the device information for (and allowing sending device 206 to access) devices with which sending device 202 is paired.

Device synchronization module 212 manages synchronization of device information between sending device 206 and cloud service 208 for a user of sending device 206. This synchronization includes obtaining device information from cloud service 208 and/or providing device information to cloud service 208. For example, device information obtained by sending device 206 from target device 204 being paired with sending device 206 is provided to cloud service 208. By way of another example, new device information can be obtained from cloud service 208 and added to device information store 214. Sending device 206 can then use that new device information to access the device for which that device information applies.

This synchronization can be performed at regular or irregular intervals, in response to certain events (e.g., new device information being stored in device information store 214, a user logging in to cloud service 208, a user request to perform the synchronization, changes to the device information, etc.), and so forth. Cloud service 208 can also optionally include synchronization functionality (e.g., as a separate module or as part of device information management module 216). The synchronization functionality in cloud service 208 can determine when to provide device information to sending device 206 (e.g., at regular or irregular intervals, in response to certain events, and so forth). For example, per-user device information store 218 includes device information for multiple devices associated with a user account, and in response to new device information being added to store 218 for that user, cloud service 208 can communicate that new device information to each other device identified in store 218 as being associated with that user account. The new device information can be communicated to each such device shortly after (e.g., within 5-10 minutes) the new device information is added to store 218, can be communicated to a device when a user next logs in to his or her user account using that device, can be communicated to a device when the device is next detected as being online and accessible to cloud service 208, and so forth. The new device information can be communicated to all devices associated with that user, or alternatively only to particular devices (e.g., devices including a particular functionality identifier). The new device information can be device information for a device that was not previously included in per-user device information store, as well as changes to device information included in per-user device information store.

Alternatively, sending device 206 can obtain the device information for target device 204 at other times (and optionally without target device 204 and sending device 206 being paired to one another). Rather, the device information for target device 204 can be obtained by sending device 206 from another device or user, and then provided to cloud service 208. For example, sending device 206 can be owned by a merchant from which a user purchases target device 204. As part of the purchasing process, sending device 206 can generate the device information for target device 204 and provide the device information to cloud service 208 (to be associated with the user account of the user making the purchase, which can be provided to sending device 206 by the user making the purchase). The device information can optionally include credential information, which device sending 206 obtains from and/or provides to target device 204 (e.g., a PIN or password included in credential information can be provided to cloud service 208 as device information, and also provided to target device 204).

Thus, it should be noted that in some embodiments sending device 206 is not paired with target device 204. In such embodiments sending device 206 need not include device association module 210 or device information store 214, and device synchronization module 212 provides device information to cloud service 208 but need not receive device information from cloud service 208.

Target device 204 includes a device association module 222 and configuration data 224. Device association module 222 manages pairing of target device 204 with other devices, such as sending device 206 as discussed above. Configuration data 224 can include various data used by target device 204 to allow other devices to access target device 204, such as credential information (e.g., a PIN, name and password, etc.). Configuration data 224 can also include various data that are user-specified settings and/or provider-supplied configuration settings.

Alternatively, rather than sending device 206 providing device information for target device 204 to cloud service 208, target device 204 itself can provide device information for target device 204 to cloud service 208. For example, the user can log in to his or her user account using target device 204, and device association module 222 (or alternatively another module of target device 204) can provide the device information for target device 204 to device information management module 216.

Receiving device 202 includes a device association module 232, a device synchronization module 234, and a device information store 236. Device association module 232 manages pairing receiving device 202 with another device, analogous to device association module 210 of sending device 206. Receiving device 202 can be paired with various other devices analogous to the discussion above regarding sending device 206 and target device 204. Device information store 236 maintains the device information for (and allowing receiving device 202 to access) devices with which receiving device 202 is paired.

Device synchronization module 234 manages synchronization of device information between receiving device 202 and cloud service 208 for a user of receiving device 202. This synchronization can be performed at regular or irregular intervals, in response to certain events, and so forth, analogous to the discussion above regarding sending device 206. This synchronization is analogous to the synchronization of device information between sending device 206 and cloud service 208 discussed above, except that the synchronization is between receiving device 202 and cloud service 208 rather than between sending device 206 and cloud service 208. For example, new device information obtained by receiving device 202 from another target device (not shown in FIG. 2) being paired with receiving device 202 can be provided to cloud service 208 (analogous to sending device 206 providing device information to cloud service 208 as discussed above). By way of another example, new device information can be obtained from cloud service 208 and added to device information store 236. Receiving device 202 can then use that new device information to access the device for which that device information applies. Thus, receiving device 202 can be paired with target device 204 automatically using cloud service 208, without the user having to manually pair target device 204 and receiving device 202.

Thus, a user of receiving device 202 can log in to his or her user account of cloud service 208, and obtain device information for the devices associated with that user account in per-user device information store 218. With this obtained device information, receiving device 202 is automatically paired with the other devices associated with that user account. The device information can be stored on receiving device 202 in device information store 236, being persisted on receiving device 202 after the user logs off his or her user account. Alternatively, the device information can be maintained by receiving device 202 while the user is logged in to his or her user account, and then deleted or otherwise protected by receiving device 202 so that the device information is not accessible on receiving device 202 after the user logs off his or her user account. For example, receiving device 202 can be a public computer via which the user logs in to his or her user account. While logged in to his or her user account, receiving device 202 can obtain the device information for (and thus access) devices associated with that user account. However, after the user logs off his or her user account, receiving device 202 protects the device information so that receiving device 202 can no longer access devices associated with that user account (until the user again logs in to his or her user account via receiving device 202). This protection of the device information can take various forms, such as encrypting the device information based on the user account (e.g., with a public key or symmetric key associated with the user account), storing the device information in a location of a storage device only accessible to the user account, deleting the device information, and so forth.

Receiving device 202 can use the device information in device information store 236 to access target device 204, even without target device 204 having been manually paired by the user with receiving device 202. Rather, target device 204 is automatically paired with receiving device 202 due to the device information for target device 204 being received from cloud service 208. The device information in store 236 includes the credential information (if any) used by receiving device 202 to access target device 204. Additionally, the device information in store 236 can also include property information (e.g., device drivers, configuration files, settings, etc.) to be used by and/or installed on receiving device 202 to access target device 204. Furthermore, the device information in store 236 can also include remote access information to be used by receiving device 202 to access target device 204 on another network.

Furthermore, it should be noted that once the device information is in device information store 236, receiving device 202 can use the device information in device information store 236 to access target device 204 regardless of whether cloud service 208 is accessible to receiving device 202. As long as the device information for target device 204 is included in device information store 236, and receiving device 202 can communicate with target device 204, receiving device 202 can use the device information for target device 204 to access target device 204.

Thus, when a user desires to allow a particular target device to be accessed by other devices associated with his or her user account, the user can simply associate the particular target device with another of the user's devices that is associated with his or her user account on cloud service 208, which will pair those two devices and result in the device information for the particular target device being made available to other devices associated with his or her user account. Alternatively, the user can simply log in to cloud service 208 from the particular target device, resulting in the device information for the particular target device being added to per-user device information store 218 as associated with his or her user account. Alternatively, the user can simply request that the seller from which he or she purchases the particular target device provide the device information for that particular target device to cloud service 208.

Each device associated with the user account of a user can obtain the device information for the other devices that are associated with the user account, allowing the various devices to access or communicate with one another based on the device information stored in cloud service 208. Receiving device 202 can use the device information for target device 204 to access target device 204 in a variety of different manners, based at least in part on the device information for target device 204.

If the device information for target device 204 includes credential information, then receiving device 202 can use that credential information to access target device 204. For example, if target device 204 is an Internet print service for which a name and password is needed for the user to print, then receiving device 202 obtains that name and password for the Internet print service from the device information for target device 204 and uses that name and password to access the Internet print service. By way of another example, if target device 204 is a wireless headset for which a PIN is needed for receiving device 202 to access the wireless headset, then receiving device 202 obtains the PIN for the wireless headset from the device information for target device 204 and uses that PIN to access the wireless headset.

If the device information for target device 204 includes remote access information, then receiving device 202 can use that remote access information to access target device 204. For example, if target device 204 is a printer on a different network than receiving device 202, then receiving device 202 obtains, from the device information for target device 204, the information used to access that network (e.g., an IP address of a gateway for the network that target device 204 is on, a password or PIN to provide to that gateway in order for receiving device 202 to be allowed to access the network that target device 204 is on, an IP address of target device on the network that target device 204 is on, and so forth) and uses that information to access the printer. By way of another example, if target device 204 is a home computer on a home network and receiving device 202 is a work computer on a work network, then receiving device 202 obtains, from the device information for target device 204, the information used to access the home network, (e.g., an IP address of a gateway for the home network, a password or PIN to provide to that gateway in order for receiving device 202 to be allowed to access the home network, etc.), and the information used to access the home computer (e.g., a name and password to provide to the home computer that the work computer is permitted to access the home computer) and uses that information to access the home computer.

If the device information for target device 204 includes property information, then receiving device 202 can use that property information to access target device 204. For example, receiving device 202 can obtain the appropriate manufacturer-supplied or user-specified settings, and configure receiving device 202 (and/or target device 204) in accordance with those settings. By way of another example, receiving device 202 can obtain the device driver for target device 204 as indicated in the device information, and install that device driver on receiving device 202 in order to access target device 204.

Additionally, based on the device information for target device 204, a consistent user experience for target device 204 can be provided to the user across all of his or her devices. For example, if the device information for target device 204 includes a friendly name for target device 204 (e.g., "home laser printer"), then that same friendly name can be displayed to the user for target device 204 regardless of which device he or she is using (e.g., his or her home computer, work computer, etc). By way of another example, if the device information for target device 204 includes an icon or a device type for which an associated icon can be obtained for target device 204 (e.g., an icon of a wireless headset), then that same icon can be displayed to the user for target device 204 regardless of which device he or she is using (e.g., his or her home computer, work computer, etc).

Figure 4:
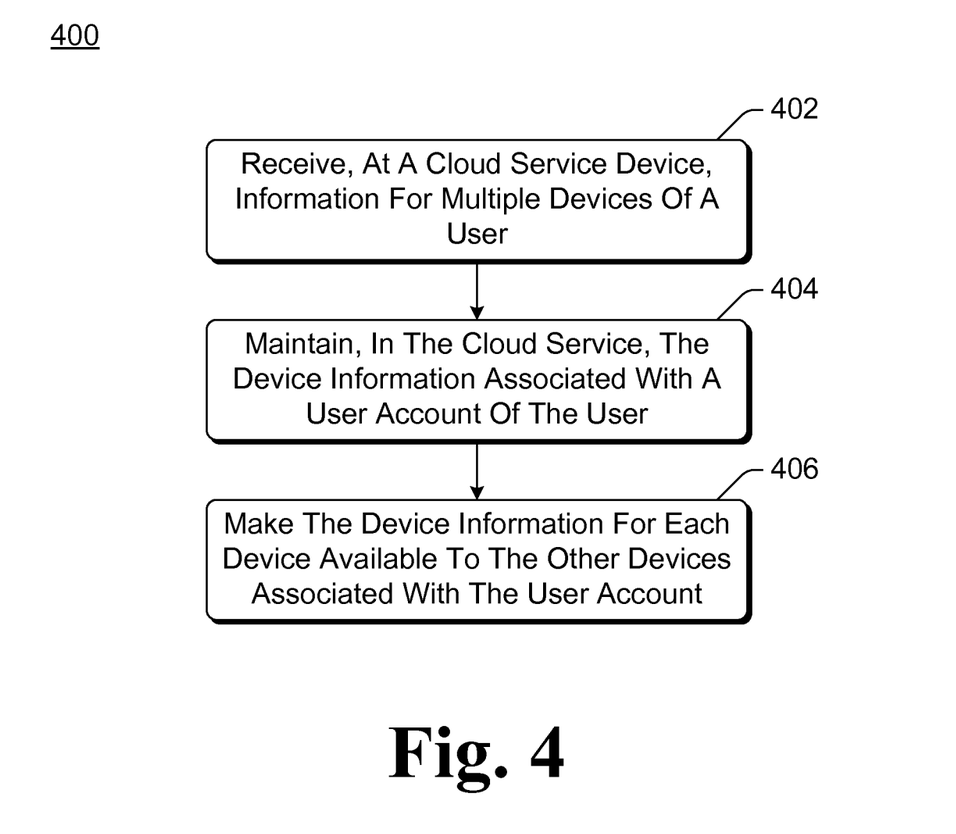
FIG. 4 is a flowchart illustrating an example process for implementing the cloud-based device information storage in accordance with one or more embodiments.

FIG. 4 is a flowchart illustrating an example process 400 for implementing the cloud-based device information storage in accordance with one or more embodiments. Process 400 is carried out by a cloud service, such as cloud service 102 of FIG. 1 or cloud service 208 of FIG. 2, and can be implemented in software, firmware, hardware, or combinations thereof. Process 400 is shown as a set of acts and is not limited to the order shown for performing the operations of the various acts. Process 400 is an example process for implementing the cloud-based device information storage; additional discussions of implementing the cloud-based device information storage are included herein with reference to different figures.

In process 400, device information for multiple devices of a user is received at a cloud service (act 402). This device information can be received from particular ones of the multiple devices or elsewhere (e.g., from a seller of one of the devices) as discussed above. The device information can include various information as discussed above.

The device information is maintained in the cloud service as associated with a user account of the user (act 404). The cloud service can store device information for multiple different users. Additionally, a single user can have multiple different user accounts with different (and/or the same) devices associated with each of the multiple accounts.

The device information for each device is made available for each of the other devices associated with the user account (act 406). The device information for a particular device can be obtained from other devices associated with the user account, and used by those other devices to access the particular device as discussed above. The device information can be made available by being synchronized between the devices and cloud service in a variety of different manners as discussed above.

Figure 5:
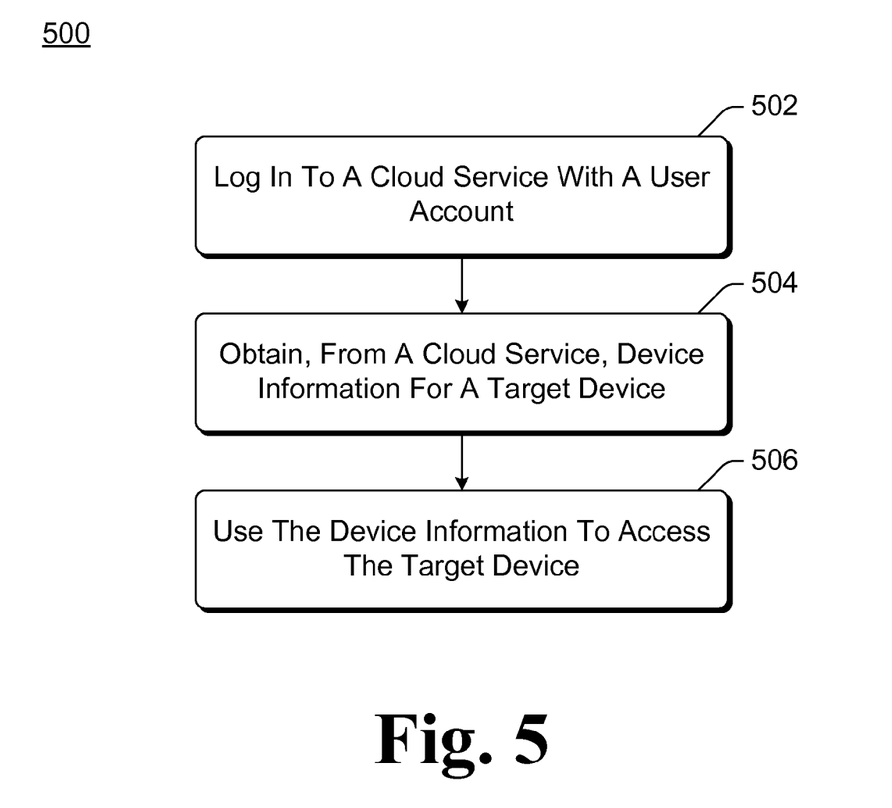
FIG. 5 is a flowchart illustrating an example process for implementing the cloud-based device information storage in accordance with one or more embodiments.

FIG. 5 is a flowchart illustrating an example process 500 for implementing the cloud-based device information storage in accordance with one or more embodiments. Process 500 is carried out by a device, such as one of devices 104-118 of FIG. 1 or device 202 of FIG. 2, and can be implemented in software, firmware, hardware, or combinations thereof. Process 500 is shown as a set of acts and is not limited to the order shown for performing the operations of the various acts. Process 500 is an example process for implementing the cloud-based device information storage; additional discussions of implementing the cloud-based device information storage are included herein with reference to different figures.

In process 500, a cloud service is logged in to with a user account (act 502) via the device implementing process 500. The cloud service maintains device information for multiple devices associated with the user account as discussed above.

Device information for a target device is obtained from the cloud service (act 504). The target device is one of the multiple devices associated with the user account with which the user is logged in to the cloud service as discussed above.

The device information is used to access the target device (act 506). The device information can include credential information, remote access information, and/or property information as discussed above.

The cloud-based device information storage techniques discussed herein support various usage scenarios. A user can log in to his or her user account and have the device information for each of his or her devices stored in the cloud service once, and then easily access any of his or her devices from others of his or her devices without needing to individually pair each set of two devices together. For example, the user may have a home computer, a work computer, and a laptop computer. When the user purchases a new device (e.g., a smartphone or a wireless headset), he or she can log in to his or her user account, pair the new device with one of his or her computers, and have all of his or her computers be able to access the new device. Alternatively, the user could have the seller of the new device add the device information to the cloud service as associated with his or her user account, as well as have the seller of the new device store the appropriate configuration data in the new device, and have all of his or her computers be able to access the new devices.

By way of another example, the user may have a work computer on a work network, a home computer on a home network, and a home printer on the same home network. The user can, using his or her work computer, log in to his or her user account on the cloud service and obtain the device information for the home printer, allowing the user to print from his or her work computer to his or her home printer.

Various actions such as communicating, receiving, storing, generating, obtaining, providing, and so forth performed by various modules are discussed herein. It should be noted that the various modules can cause such actions to be performed. A particular module causing an action to be performed includes that particular module itself performing the action, or alternatively that particular module invoking or otherwise accessing another component or module that performs the action (or performs the action in conjunction with that particular module).

Figure 6:
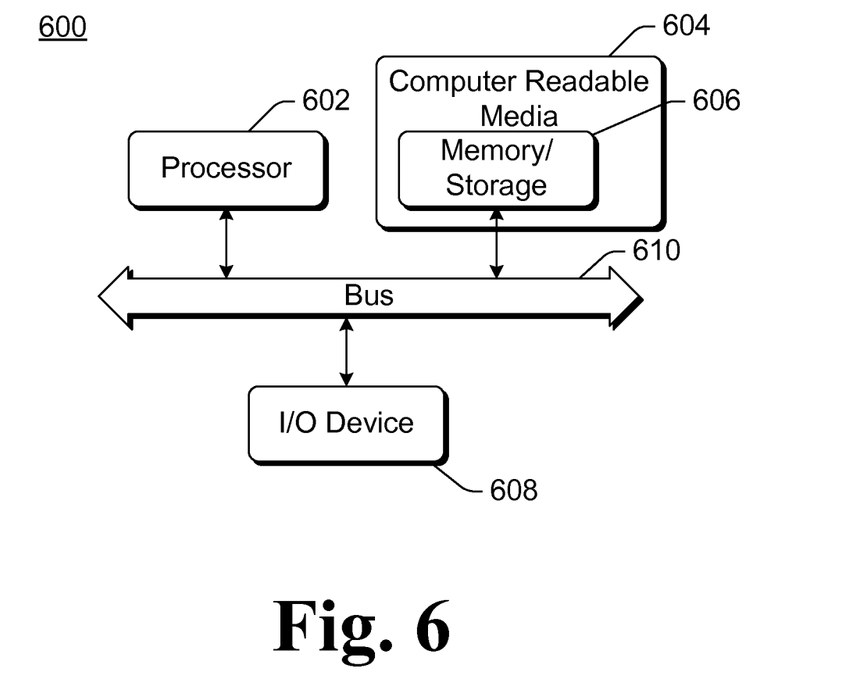
FIG. 6 illustrates an example computing device that can be configured to implement the cloud-based device information storage in accordance with one or more embodiments.

FIG. 6 illustrates an example computing device 600 that can be configured to implement the cloud-based device information storage in accordance with one or more embodiments. Computing device 600 can be, for example, one of devices 104-118 of FIG. 1, a device implementing at least part of cloud service 102 of FIG. 1, one of devices 202-206 of FIG. 2, a device implementing at least part of cloud service 208 of FIG. 2, and so forth.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or nonvolatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the cloud-based device information storage techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   maintaining, by a cloud service and associated with a user account of a user of the cloud service, device information for each of multiple devices associated with the user account, the device information including, for one or more of the multiple devices, credential information allowing the device to be accessed by other ones of the multiple devices;
   making the device information for a first device associated with the user account available through the cloud service to a second device associated with the user account; and
   making the device information for the second device available through the cloud service to the first device.

2. A method as recited in claim 1, the device information for each device including a container identifier that allows the device information for each device to be distinguished from the device information for other devices of the multiple devices.

3. A method as recited in claim 1, the credential information for a device including a name and password used to access the device.

4. A method as recited in claim 1, the device information including, for each of at least one of the multiple devices, remote access information indicating how the device can be accessed by the other devices of the multiple devices on other networks across the Internet.

5. A method as recited in claim 1, the device information including, for each of at least one of the multiple devices, property information including settings for the device.

6. A method as recited in claim 1, the device information including, for each of at least one of the multiple devices, an indication of one or more device drivers and applications to be installed on other devices of the multiple devices in order to access the device.

7. A method as recited in claim 1, the device information including, for each of at least one of the multiple devices, one or more attributes of the device to provide a common user experience for the device across other devices of the multiple devices.

8. A method as recited in claim 1, further comprising:
   receiving additional device information for a new device associated with the user account;
   the maintaining including maintaining the additional device information as associated with the user account; and
   the making including making the additional device information available to other ones of the multiple devices.

9. A method as recited in claim 8, further comprising receiving at least part of the additional device information from the new device.

10. A method as recited in claim 8, further comprising receiving at least part of the additional device information from a seller of the new device.

11. One or more computer storage memories having stored thereon multiple instructions that, when executed by one or more processors of a first device, cause the one or more processors to:
- obtain, from a cloud service, device information for a second device, the device information being associated with a user account of a user logged in to the cloud service; and
- communicate with the second device using the device information obtained from the cloud service.

12. One or more computer storage memories as recited in claim 11, the device information including credential information for the second device, and the instructions that cause the one or more processors to use the device information comprising instructions that cause the one or more processors to use the credential information to access the second device.

13. One or more computer storage memories as recited in claim 11, the device information including remote access information indicating how the second device can be accessed by the first device, the first device being on a first network and the second device being on a second network, the instructions that cause the one or more processors to use the device information comprising instructions that cause the one or more processors to access the second device using the remote access information.

14. One or more computer storage memories as recited in claim 13, the remote access information including both an identifier of a gateway of the second network and an identifier of the second device on the second network.

15. One or more computer storage memories as recited in claim 11, the device information including an indication of one or more device drivers to be installed in order to access the second device, the instructions that cause the one or more processors to use the device information comprising instructions that cause the one or more processors to install the one or more device drivers on the first device prior to accessing the second device.

16. One or more computer storage memories as recited in claim 15, the instructions that cause the one or more processors to use the device information comprising instructions that cause the one or more processors to obtain the one or more device drivers from a location indicated by the device information.

17. One or more computer storage memories as recited in claim 11, the device information including one or more settings, the instructions that cause the one or more processors to use the device information comprising instructions that cause the one or more processors to configure the first device in accordance with the one or more settings.

18. One or more computer storage memories as recited in claim 11, the multiple instructions further causing the one or more processors to persist, on the first device after the user has logged off the cloud service, the device information for the second device.

19. One or more computer storage memories as recited in claim 11, the multiple instructions further causing the one or more processors to:
- receive additional device information for a new device paired to the first device;
- provide the additional device information to the cloud service for association of the additional device information with the user account.

20. A method, implemented on a first device, comprising:
- logging in to a cloud service with a user account;
- obtaining, from the cloud service, device information for a second device, the device information being associated with the user account, the device information including credential information allowing the second device to be accessed, remote access information indicating how the first device on one network can access the second device on another network, and one or more device drivers to be installed on the first device in order to allow communication with the second device; and
- using the device information to access the second device, the using including using the credential information to access the second device, accessing the second device as indicated by the remote access information, and installing the one or more device drivers on the first device prior to accessing the second device.

\* \* \* \* \*